United States Patent [19]

Heller

[11] 4,440,044

[45] Apr. 3, 1984

[54] TWO STAGE SPEED REDUCER

[75] Inventor: Werner H. Heller, West Valley, N.Y.

[73] Assignee: UMC Industries, Inc., Stamford, Conn.

[21] Appl. No.: 275,499

[22] Filed: Jun. 22, 1981

[51] Int. Cl.³ .............................................. F16H 1/28
[52] U.S. Cl. ........................................ 74/804; 74/788
[58] Field of Search ................. 74/768, 788, 803, 804, 74/785, 801, 805

[56] References Cited

U.S. PATENT DOCUMENTS

| | | | |
|---|---|---|---|
| 2,170,951 | 8/1939 | Perry | 74/804 |
| 2,666,345 | 1/1954 | Amberg | 74/804 |
| 3,037,400 | 6/1962 | Sundt | 74/804 |
| 3,602,070 | 8/1971 | Verge et al. | 74/804 |
| 3,792,629 | 2/1974 | Applebury | 74/801 |
| 3,939,737 | 2/1976 | Horvath | 74/805 |
| 4,155,276 | 3/1977 | Fengler | 74/804 |
| 4,228,698 | 10/1980 | Winiasz | 74/805 |
| 4,235,129 | 11/1980 | Takasu | 74/805 |

Primary Examiner—Leslie A. Braun
Assistant Examiner—Stephen Andrews
Attorney, Agent, or Firm—Allen J. Jaffe

[57] ABSTRACT

A two stage speed reducer having a primary reduction stage the output gear of which is fixed to an eccentric which causes an output planetary gear to orbit within a fixed ring gear. The eccentric forms the inner and outer races for coplanar bearings for the planetary gear and the output gear, respectively.

8 Claims, 2 Drawing Figures

TWO STAGE SPEED REDUCER

BACKGROUND OF THE INVENTION

The present invention relates to two stage speed reducers and, more particularly, to such reducers having a primary reduction stage, the output gear of which provides the drive for the output or secondary stage which consists of an eccentric, an output planetary gear and a fixed ring gear.

Eccentric planetary drives are well known in the art, as typified by one or more of the following prior patents:

1. U.S. Pat. No. 3,037,400 discloses a two stage reducer wherein an eccentric drives, through bearings, a stepped pinion which mates with a stationary ring gear and an output ring gear.
2. U.S. Pat. No. 3,939,737 discloses an arrangement wherein a stepped pinion is eccentrically driven by an input shaft, through bearings, for engagement with a fixed ring gear and an output ring gear.
3. U.S. Pat. No. 4,235,129 discloses an arrangement wherein the hub of an input pulley is the eccentric for driving a floating pinion that coacts with an output ring gear. The eccentric hub forms the inner race for the bearings which permit rotation of the floating pinion.
4. U.S. Pat. No. 4,155,276 discloses an arrangement wherein first and second stage spur gears are driven by eccentric ring gears.
5. U.S. Pat. No. 3,602,070 discloses an arrangement wherein orbital movement of a floating gear is accomplished by planetary rollers or gears of different sizes.

SUMMARY OF THE INVENTION

The present invention provides a two stage speed reducer that is compact, efficient and relatively inexpensive and is capable of achieving extremely high reduction ratios.

Although it is known to utilize eccentric bearing assemblies to produce radial thrust to cause a planet gear to orbit within an annular ring gear, the apparatus of the present invention incorporates such an assembly in a structurally compact and novel two stage speed reducer. More specifically, in the apparatus of this invention the bearing assembly which permits relative rotation of the output gear of the first speed reduction stage also permits relative rotation of the eccentric for driving the output planetary gear of the second speed reduction stage. This bearing assembly in combination with a substantially coplanar radial thrust producing bearing provides an economy of structure not realized heretofore in this art, much less in the combination of the two stage speed reducer of the present invention as will become apparent hereinbelow.

Essentially, then, the present invention provides a two stage speed reducer, comprising; a casing; a primary reduction stage having an output gear; means for mounting the output gear for rotation with respect to the casing; an output stage ring gear fixed to the casing; an output stage planetary gear in mating engagement with the output stage ring gear and mounted for orbital movement therewithin by the first mentioned means.

Other characterizing features and advantages of the present invention will become readily apparent from the ensuing detailed description thereof.

BRIEF DESCRIPTION OF THE DRAWINGS

For a fuller understanding of the present invention, reference should now be made to the following detailed description thereof taken in conjunction with the accompanying drawings, wherein.

DETAILED DESCRIPTION OF THE PREFERRED EMBODIMENT

Figure 1:
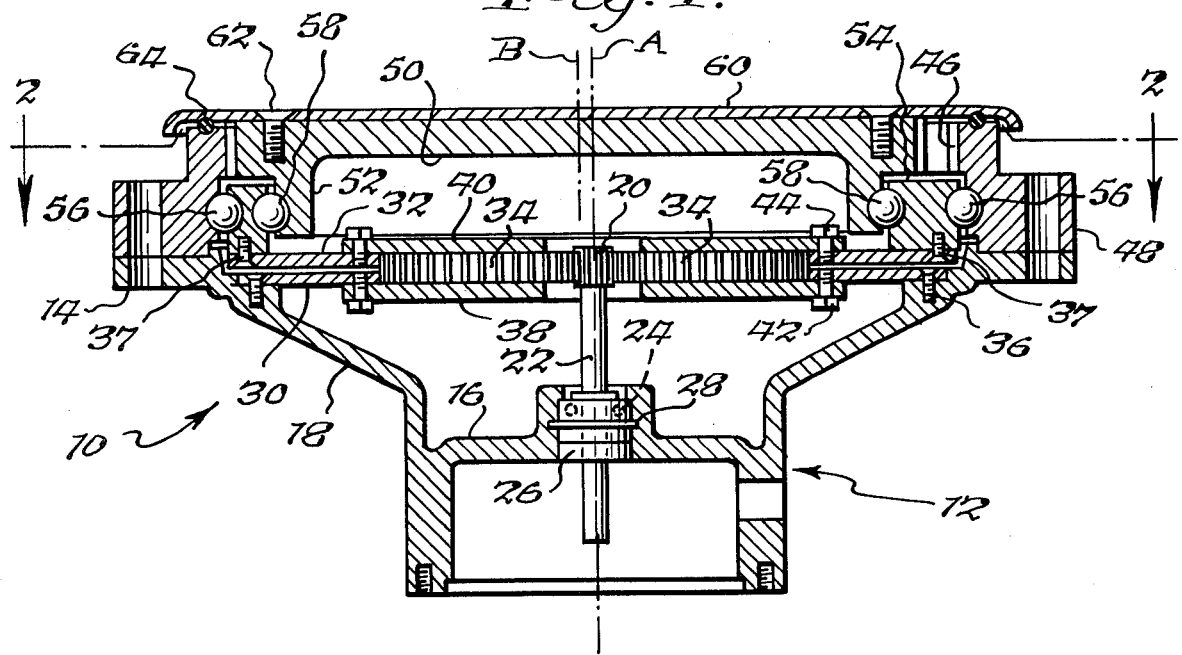
FIG. 1 is a sectional view taken through the speed reducer of the present invention.
Figure 2:
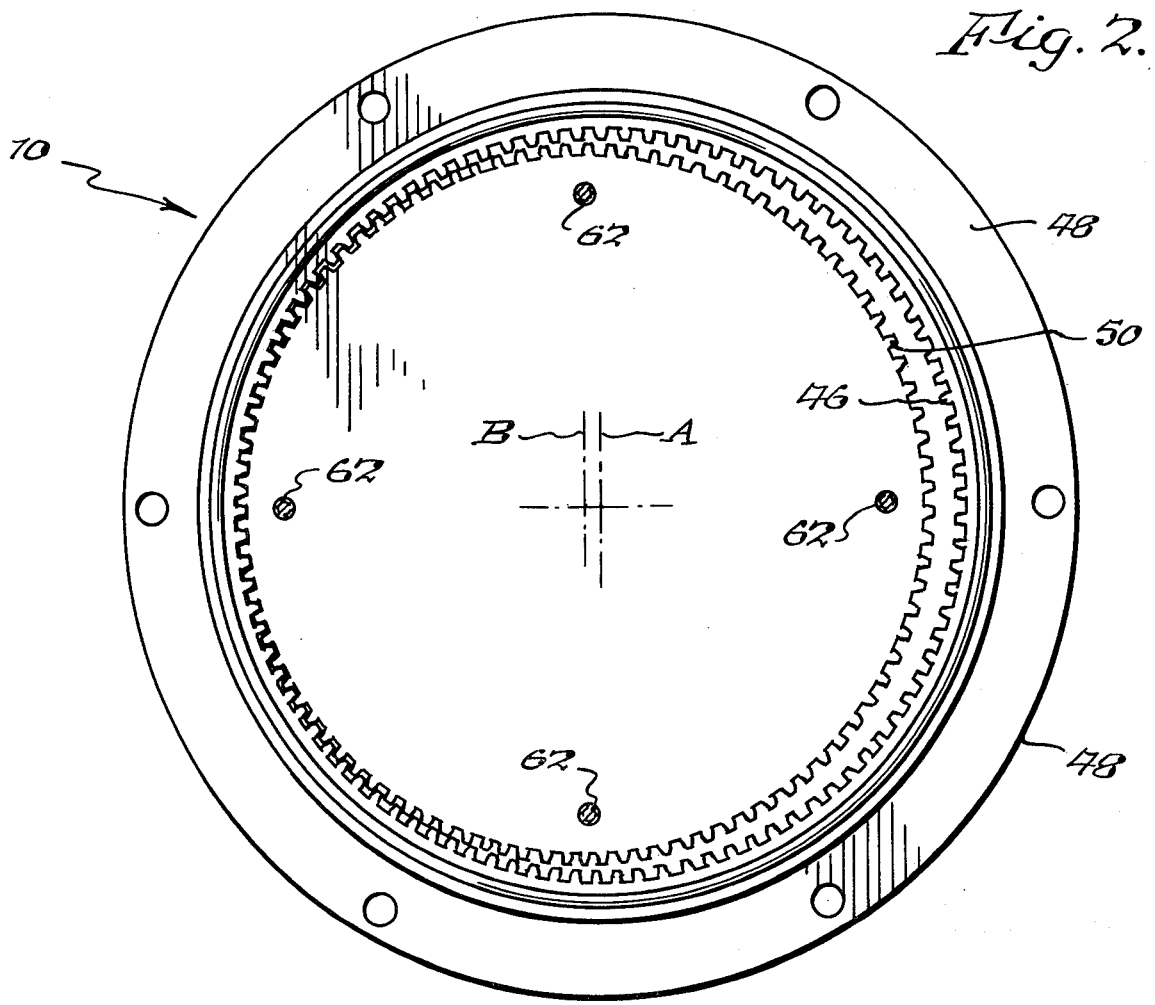
FIG. 2 is a view looking substantially in the direction of line 2—2 of FIG. 1.

Referring in detail to the drawings, the speed reducer of the invention is generally depicted at 10 and is shown as including a supporting base member 12 having an outer peripheral flange 14 and an inner wall 16 internally connecting thereto by a substantially frustroconical sidewall 18. Although the primary reduction stage can take any convenient form, the same is depicted herein (for exemplary purpose) as a fixed differential planetary gear drive. It should be understood, however, that other types of primary reduction stages can be employed. Thus, an input sun gear 20 having its shaft 22 passing through wall 16 is supported for rotation about axis A by bearings 24. Suitable oil seals 26 and a snap ring 28 may be provided, as is conventional. Completing the illustrated primary reduction stage is a stationary ring gear 30, coaxial with sun gear 20, a movable ring gear 32 and planetary gear means 34 in mating engagement with the sun gear 20 and the ring gears 30 and 32. Stationary ring gear 30 is suitably fixed by secured to an interior annular ledge of base member 12 by fasteners 36. Planetary gear means 34 is maintained in a plane substantially perpendicular to axis A by means of a pair of spaced annular parallel plates 38,40 in bearing engagement therewith. Plate 38 is fixed to stationary ring gear 30 by fasteners 42, whereas plate 40 is fixed to movable ring gear 32 by fasteners 44. Plates 38 and 40 function to effectively resist twisting movement induced by the ring gears 30,32 on the planetary gear means 34.

Although planetary gear means 34 is depicted as at least one planetary gear in simultaneous mating engagement with both ring gears 30 and 32 in the manner taught in copending U.S. Application Ser. No. 257,928 filed Apr. 27, 1981; which is assigned to the assignee of the present invention, it is obvious that separate sets of planetary gears may be provided for respective mating engagement with the ring gears.

The secondary or output stage includes a stationary ring gear 46 which is integrally supported in upstanding relation to a flange plate 48 that is coextensive with and suitably secured to flange 14 of base member 12 to thereby define with such base member a casing or housing for the movable component of the speed reducer. Ring gear 46 is centered on axis A of sun gear 20 and ring gears 30 and 32. The secondary stage further includes an output planet gear 50 in meshing engagement with ring gear 46 and having a central axis B that is parallel to but spaced from axis A. In accordance with the present invention, means are provided for mounting gear 50 for orbital movement within stationary gear 46 and for mounting ring gear 32 for rotational movement with respect to the casing defined by base member 12 and flange member 48. To this end, gear 50 is provided with an integrally depending skirt 52 adjacent to but spaced from the inner annular surface of flange member 48. An eccentric 54, rigidly fixed to ring gear 32 by fasteners 37 in upstanding relation thereto, is received within the space defined by flange member 48 and skirt 52 to thereby define and contain the inner race for an outer set of bearings 56 and the outer race for an inner set of bearings 58. As shown, the casing flange member 48 defines and contains the outer race for the outer bearings 56 and the planetary gear skirt 52 defines and contains the inner race for the inner bearings 58. Bearings 56 and 58 are substantially coplanar and contained within planes that are substantially transverse to the sun gear axis A. The arrangement is such that bearings 56 permit rotation of first stage ring gear 32 with respect to stationary ring gears 30 and 46 whereas bearings 58 transmit the radial thrusts produced by the rotating eccentric 54 to cause output gear 50 to rotate about its axis B while this axis orbits about axis A. Bearings 58 further serve to fully support output gear 50 about its entire peripheral skirt 52 without any lost motion or looseness as could cause excessive vibration, noise and the like.

A suitable cover plate 60 may be secured to output gear by fasteners 62 for movement therewith and for sealing movement with respect to fixed ring gear 46 by means of an o-ring 64 or the like. This cover is particularly advantageous in the event the gears are flooded with oil. Any suitable driven art device may be secured to or through cover plate 60 for movement with output planet gear 50, as is well known.

First stage output ring gear 32 has a slightly different number of teeth than first stage fixed ring 30 such that high speed inputs from sun gear shaft 22 generate a greatly reduced rotational speed in ring gear 32. Rotation of ring gear 32 causes rotation of eccentric 54 about axis B which, in turn, transmits radial forces through bearing 58 to output planetary gear 50 to cause the same to orbit within fixed ring gear 46. In this manner gear 50 rotates about its center axis B (which axis rotates about the central axis A of sun gear 20, ring gears 30 and 32 and ring gear 46) at a speed that is much less than that of the output gear 32 of the primary reduction stage.

For example, if the respective tooth numbers of sun gear 20, planet gear means 34, fixed gear 30 and movable gear 32 were 15, 54, 120 and 123 then the reduction ratio of the primary stage would be 369:1. With the output stage fixed gear 46 having 173 teeth and the output planetary ring gear 50 having 172 teeth then the overall reduction ratio from input shaft 22 to output gear 50 would be 369 times 172 or 63,468:1.

It should be readily apparent that the speed reducer of the present invention is capable of achieving very high reduction ratios while also providing a compact arrangement of functioning components.

A preferred embodiment of the present invention has been disclosed and described; however, changes will obviously occur to those skilled in the art without departing from the spirit thereof. It is, therefore, intended that the invention is to be limited only by the scope of the appended claims.

What is claimed is:

1. A speed reducer, comprising:
   a casing;
   a primary speed reduction stage including an output element;
   an output stage ring gear fixed to said casing;
   means for mounting said output element for rotation with respect to said casing;
   an output stage planetary gear in mating engagement with said ring gear and mounted for orbital movement therewithin by said first mentioned means;
   said first mentioned means including an eccentric rigidly fixed to said output element, outer bearings between said eccentric and said casing, and inner bearings between said eccentric and said output stage planetary gear;
   said eccentric contains the inner and outer races for said outer and inner bearings, respectively; and
   said casing and said output stage planetary gear contain the outer and inner races for said outer and inner bearings, respectively.

2. The speed reducer according to claim 1, wherein:
   said bearings are located in planes substantially perpendicular to the central axis of said output stage ring gear.

3. The speed reducer according to claim 2, wherein:
   said output stage planetary gear includes an annular skirt, the outer periphery of which forms the inner race for said inner bearings.

4. The speed reducer according to claim 1, wherein:
   said output stage planetary gear includes an annular skirt, the outer periphery of which forms the inner race for said inner bearings.

5. The speed reducer according to claim 1, wherein:
   said output element comprises a movable ring gear; and
   said primary speed reduction stage further includes a sun gear mounted for rotation with respect to said casing, a stationary ring gear fixed to said casing adjacent said movable ring gear, and planetary gear means in meshing engagement with said sun gear and said stationary and movable ring gears.

6. The speed reducer according to claim 5, further comprising:
   a pair of spaced parallel plates in bearing relation to said planetary gear means, one of which fixed to said movable ring gear and the other of which fixed to said stationary ring gear whereby said planetary gear means is supported in planes substantially perpendicular to the axis of said sun gear.

7. A speed reducer comprising:
   a casing;
   a ring gear fixed to said casing;
   an output planetary gear in mating engagement with said ring gear and having an annular skirt in spaced relation to said casing;
   an eccentric located between said skirt and said casing;
   outer bearings between said eccentric and said casing;
   inner bearings between said eccentric and said annular skirt; and
   said eccentric contains the inner and outer races for said outer and inner bearings, respectively, and said casing and said output planetary gear contain the outer and inner races for said outer and inner bearings, respectively whereby rotation of said eccentric about a central axis causes said planetary gear to orbit about said central axis.

8. The speed reducer according to claim 7, wherein:
   said bearings and said eccentric are contained within planes that are substantially perpendicular to said central axis.

* * * * *